Feb. 18, 1930.   O. M. SUMMERS   1,747,332
CHECK VALVE
Filed Feb. 17, 1926
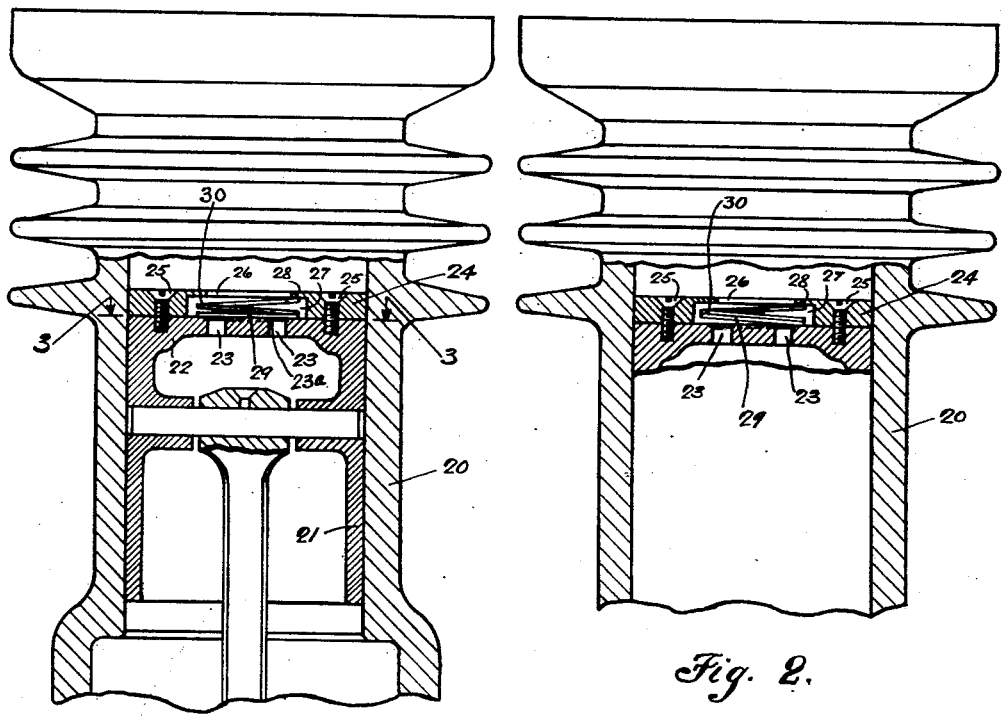
Fig. 1.
Fig. 2.
Fig. 4.
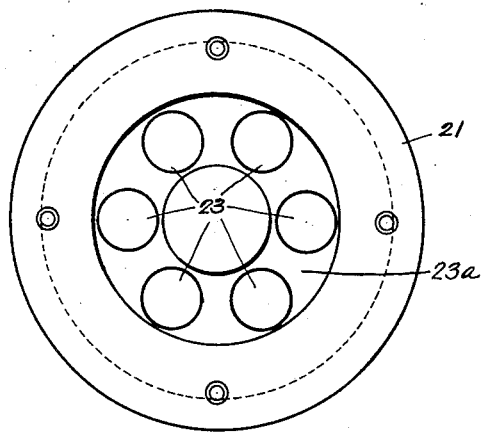
Fig. 3.
Inventor
Otto M. Summers
By Spencer, Sewall & Hardman
his Attorneys Patented Feb. 18, 1930

1,747,332

UNITED STATES PATENT OFFICE

OTTO M. SUMMERS, OF DAYTON, OHIO, ASSIGNOR, BY MESNE ASSIGNMENTS, TO FRIGIDAIRE CORPORATION, A CORPORATION OF DELAWARE

CHECK VALVE

Application filed February 17, 1926. Serial No. 88,966.

This invention relates to improvements in check valves particularly adapted to the compressor pump used in refrigerating apparatus.

It is among the objects of the present invention to provide a valve structure which will operate efficiently and quietly in order that the said valve may be used in refrigerating apparatus for the household type.

Further objects and advantages of the present invention will be apparent from the following description, reference being had to the accompanying drawings, wherein a preferred form of the present invention is clearly shown.

In the drawings:

Fig. 1 is a sectional view of the compressor cylinder, showing the valve structure in closed position.

Fig. 2 is a view similar to Fig. 1, showing the valve open.

Fig. 3 is a transverse section taken along the line 3—3 of Fig. 1.

Fig. 4 is a detail view of the spring member of the valve.

Referring to the drawings, numeral 20 designates the compressor cylinder provided with a piston 21. The piston head 22 has a plurality of apertures 23 which form valve ports. The top of the piston head is undercut so as to form a circular groove 23ª of a width slightly greater than the diameter of the port holes. When so provided this undercut portion permits better seating of the valve on the piston head.

A plate 24 is secured to the top of the piston head by means of screw 25, staked in the plate to insure their stability. This plate has a central aperture 26 which is counterbored to form a valve cage 27. Counterboring the plate 24 defines the flange 28. Within the valve cage 27 and normally resting on the top of the piston head is a disc valve 29 which is of sufficient size to cover all of the valve ports 23.

Between the disc valve 29 and the flange 28 of plate 24 there is interposed a split ring spring 30 having preferably but one convolution, one end of said spring engaging with the flange 28, the other end of this spring engaging with the disc valve 29 adjacent its edge.

As shown in Fig. 4 the spring may be made up of flat stock in the form of a "lock washer", that is, the spring may be in the shape of a split washer having its ends out of alignment.

When the piston 21 moves downwardly the vacuum formed in the cylinder above the piston will lift the valve 29 in a tilting manner the portion of the valve engaged by the spring 30 acting as the fulcrum thus opening all of the ports 23 and permitting the fluid to flow through the said ports into valve cage 27 and thence through aperture 26 into the space above the plate 24. On the reverse movement the piston will compress the fluid in the space above the plate 24, thus permitting the spring 30 to move the disc valve 29 against the top of the piston head which forms the seats for valve ports 23 and thus shut off communication between the space above and below the piston head 22. The opening of the valve in a tilting manner will substantially eliminate or reduce the noise of its operation to a minimum.

An inexpensive spring of the type illustrated in Fig. 4 may be made by the punching process.

While the form of embodiment of the invention as herein disclosed, constitutes a preferred form, it is to be understood that other forms might be adopted, all coming within the scope of the claims which follow.

What is claimed is as follows:

1. A valve for a piston comprising an apertured piston head; a plate adapted to be secured to said head said plate including a central aperture, counterbored to include all of the piston head apertures and forming a valve cage; a disc valve on the piston head said valve normally closing all of said passages; and a split ring spring interposed between the plate and disc valve one end of said spring engaging the disc valve adjacent its edge whereby to permit tilting of the same to open the passages.

2. A fluid check valve for compressors comprising in combination a port and a valve seat surrounding said port, a floating disc valve adapted to coact with said seat and having an area exposed to fluid pressure and resilient means adapted to urge said valve to said seat, said resilient means engaging said valve in such a manner that the resultant of force of said means acts on the valve in a line passing outside the center of pressure on said area, and means for maintaining said resilient means in position.

3. A fluid check valve for compressors, comprising in combination a port and a valve seat surrounding said port, a floating disc valve adapted to coact with said seat and having an area exposed to fluid pressure and a split ring spring adapted to urge said valve to said seat, said spring engaging said valve in such a manner that the resultant of force of said spring acts on said valve in a line passing outside the center of pressure on said disc, and means for maintaining said spring in position.

4. A fluid check valve for compressors comprising in combination, a port and a valve seat surrounding said port, a floating disc valve adapted to coact with said seat and having an area exposed to fluid pressure, and means cooperating with the valve for causing the fluid acting thereon to tilt the valve during normal operation.

In testimony whereof I hereto affix my signature.

OTTO M. SUMMERS.